METHOD AND APPARATUS FOR MAKING INDIVIDUAL
MEMBERS FROM A LENGTH OF STOCK
Filed Jan. 2, 1964

INVENTOR.
ALLEN D. GETTIG

BY Glenn, Palmer & Matthews

HIS ATTORNEYS

United States Patent Office 3,321,950 Patented May 30, 1967

3,321,950

METHOD AND APPARATUS FOR MAKING INDIVIDUAL MEMBERS FROM A LENGTH OF STOCK

Allen D. Gettig, Phoenix, Ariz., assignor to Reynolds Metals Company, Richmond, Va., a corporation of Delaware Filed Jan. 2, 1964, Ser. No. 335,071
19 Claims. (Cl. 72—255)

This invention relates to an improved apparatus and method for making a plurality of individual members from a length of stock comprising a plurality of the members integrally interconnected together.

According to the teachings of this invention, a length of stock is provided wherein a plurality of individual members are integrally interconnected together to form the stock, the stock being formed by an extrusion process or the like.

Thereafter, this invention provides improved means for separating those members from each other to provide a plurality of individual members.

Accordingly, it is an object of this invention to provide an improved method for making a plurality of individual members from a length of stock being formed with the members integrally interconnected together.

Another object of this invention is to provide an improved apparatus for making such individual members from such a length of stock or the like.

Other objects, uses and advantages of this invention are apparent from a reading of this description which proceeds with reference to the accompanying drawings forming a part thereof and wherein.

Figures 1, 2, 3, 4, 5, 6, 7, 8, 9, 10:
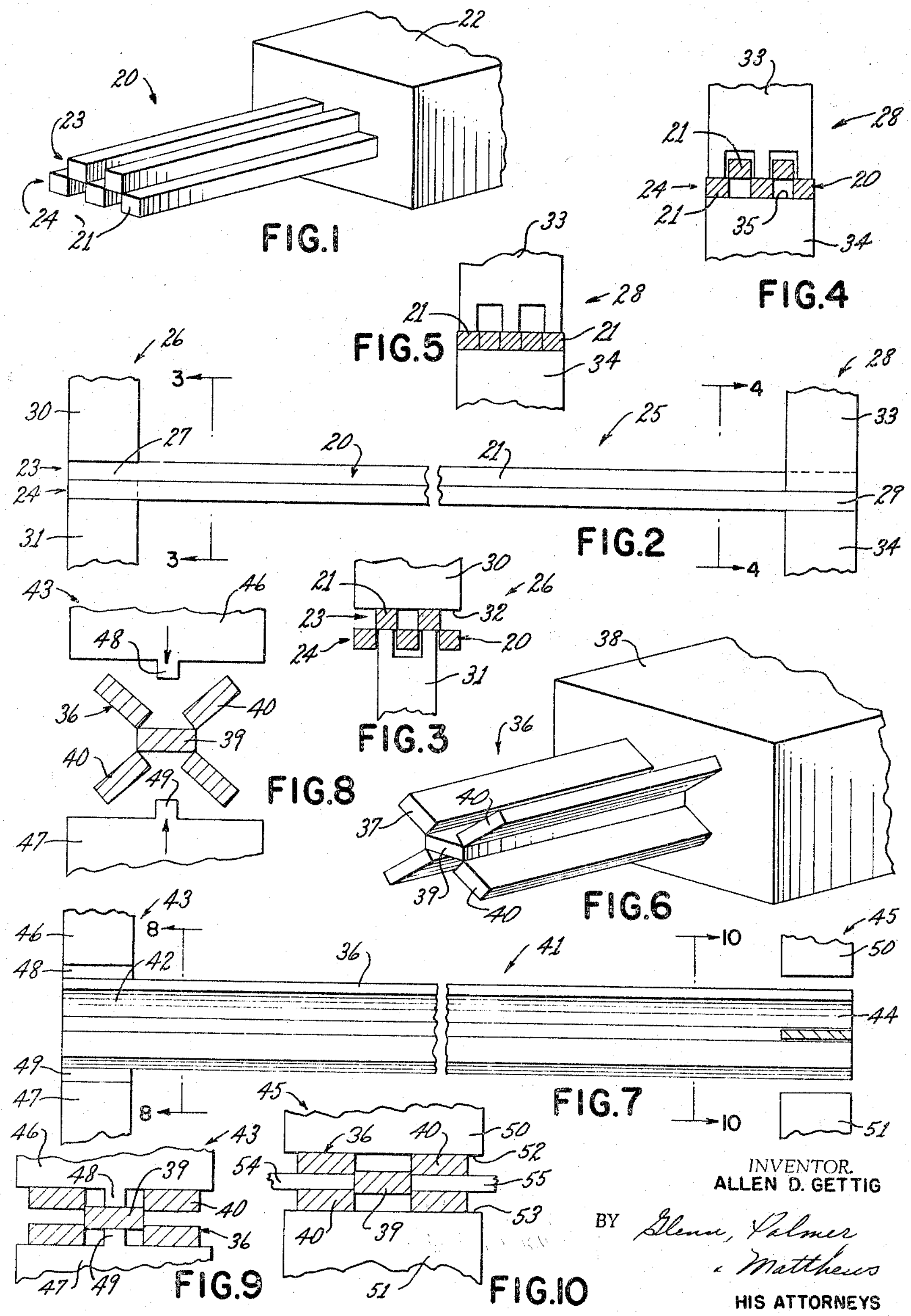
FIGURE 1 is a perspective view illustrating one method of forming one embodiment of the length of stock of this invention.
FIGURE 2 is a schematic side view illustrating one apparatus of this invention for separating the members of the stock illustrated in FIGURE 1.
FIGURE 3 is an axial, cross-sectional view taken on line 3—3 of FIGURE 2.
FIGURE 4 is a fragmentary, cross-sectional view taken on line 4—4 of FIGURE 2.
FIGURE 5 is a view similar to FIGURE 4 and illustrates the apparatus of this invention after the individual members have been separated from each other.
FIGURE 6 is a view similar to FIGURE 1 and illustrates another embodiment of this invention.
FIGURE 7 is a view similar to FIGURE 2 and illustrates another apparatus of this invention for forming individual members from the stock illustrated in FIGURE 6.
FIGURE 8 is an axial, cross-sectional view taken on line 8—8 of FIGURE 7.
FIGURE 9 is a view similar to FIGURE 8 and illustrates the die members in their closed position.
FIGURE 10 is an axial, cross-sectional view taken on line 10—10 of FIGURE 7 with the respective die members in their closed position.

While the various features of this invention are hereinafter described and illustrated as being particularly adaptable to form individual members from a length of stock, it is to be understood that the various features of this invention can be utilized singly or in any combination thereof to provide other devices as desired.

Therefore, this invention is not to be limited only to the embodiments illustrated in the drawings, because the drawings are merely utilized to illustrate one of the wide variety of uses of this invention.

Referring now to FIGURE 1, the improved stock of this invention is generally indicated by the reference numeral 20 and comprises a plurality of individual members 21 integrally joined to each other in a manner now to be described, the length of stock 20 being formed in any suitable manner, such as by being extruded from a conventional extruding apparatus 22 as illustrated in FIGURE 1.

The length of stock 20 comprises two rows 23 and 24 of individual members 21 respectively having rectangular cross-sectional configurations, each member 21 of each row 23 and 24 being integrally joined to at least one member 21 of the other row 23 or 24 at adjacent corners of the joined members 21.

Therefore, it can be seen that it is a relatively simple process to form the length of stock 20 having the desired number of members 21 integrally interconnected together.

After the desired length of the stock 20 has been provided by the apparatus 22, the stock 20 is cut to the desired length whereby the same can be placed in the apparatus 25 of this invention which is illustrated schematically in FIGURE 2.

In particular, the apparatus 25 comprises a first die means 26 to operate on the end 27 of the stock 20 while another die means 28 is provided to operate on the opposed end 29 of the stock 20.

The die means 26, as illustrated in FIGURES 2 and 3, comprises a pair of relatively movable die members 30 and 31, the die member 30 having a lower surface 32 adapted to abut against the upper surface of the member 21 of the row 23 of the stock 20.

The lower die member 31 of the die means 26 is so constructed and arranged that the same is adapted to engage only the lower surfaces of the members 21 of the row 23 of the stock 20 in the manner illustrated in FIGURE 2 whereby it can be seen that the die means 26 is only adapted to hold one row 23 of the members 21 of the stock 20 at one end of the stock 20.

Similarly, the die means 28 of this invention is adapted to hold only the members 21 of the other row 24 of the stock 20 at the other end 29 of the stock 20.

In particular, reference is made to FIGURE 4 wherein it can be seen that the die means 28 comprises an upper die member 33 and a lower die member 34, the lower die member 34 having a surface 35 adapted to engage the lower surfaces of the members 21 of the row 24 of the stock while the upper die member 33 is so constructed and arranged that the same only engages the opposed surfaces of the members 21 of the row 24 of the stock 20.

After the length of stock 20 has been clamped between the die means 26 and 28 in the manner illustrated in FIGURE 2, relative movement is caused between the die means 26 and 28 to shear the individual members 21 from each other whereby a plurality of separate individual members 21 are provided.

For example, should the relative movement between the die means 26 and 28 increase the distance between the die means 26 and 28, the die means 26 will pull the members 21 of the row 23 of the stock 20 to the left while the die means 28 will pull the members 21 of the row 24 of the stock 20 to the right whereby not only are the members 21 sheared from each other at the integrally joined corners thereof, but also the individual members 20 will be untwisted or straightened by the apparatus 25.

In particular, just before the individual members 21 are sheared from each other in the above manner, the relative movement of the die means 26 and 28 away from each other causes the entire length of stock 20 to be untwisted or straightened in a conventional manner.

Therefore, it can be seen that the method and apparatus 25 of this invention is readily adaptable to separate the members 21 from each other when the same are joined integrally while at the same time straightening the members 21 for the intended use thereof.

While one form of stock 20 has been illustrated in FIGURES 1–5, it is to be understood that the method and apparatus of this invention can be utilized to form individual members from other types of stock as desired.

In particular, reference is made to FIGURE 6 wherein another length of stock of this invention is generally indicated by the reference numeral 36 and comprises a plurality of individual members 37 integrally joined together, the stock 36 being formed in any suitable manner, such as by being extruded by conventional apparatus 38 in a manner well known in the art.

As illustrated in FIGURE 6, the stock 36 comprises a central member 39 integrally joined at the four corners thereof to four corners of four outer members 40, the members 39 and 40 each having substantially rectangular cross-sectional configurations.

However, it is to be understood that the cross-sectional configurations of the members 39 and 40 as well as the members 21 of this invention can vary as desired.

After the desired length of the stock 36 has been produced by the extruding apparatus 38, the same is cut therefrom and placed in an apparatus 41 of this invention wherein the left-hand end 42 of the stock 36 is placed in a die means 43 while the opposed end 44 thereof is placed in a die means 45.

As illustrated in FIGURES 8 and 9, the die means 43 comprises upper and lower die members 46 and 47 respectively having downwardly extending projections 48 and 49 adapted to clamp only the central member 39 of the stock 36 therebetween in the manner illustrated in FIGURE 9.

Thus, when the die members 46 and 47 move toward each other from the position illustrated in FIGURE 8 to the position illustrated in FIGURE 9, the same bend the outer members 40 of the stock 36 in the manner illustrated in FIGURE 9 while only clamping the central member 39 between the projections 48 and 49 thereof. Accordingly, the die members 46 and 47 only hold the central member 39 of the stock 36 therebetween at the end 42 of the stock 36.

However, the die means 45 of the apparatus 41 comprises upper and lower die members 50 and 51 respectively having opposed flat surfaces 52 and 53 for respectively engaging the outer members 40 of the stock 36 therebetween without holding the central member 39. A pair of side members 54 and 55 respectively cooperate with the die members 50 and 51 to cause the outer members 40 of the stock 36 to be held between the die members 50 and 51. Thus, when the die members 50 and 51 come together in the manner illustrated in FIGURE 10, the same firmly grasp only the outer members 40 of the stock 36 at the end 44 thereof.

Accordingly, when relative movement is provided between the die means 43 and 45 of the apparatus 41, the individual members 39 and 40 are sheared from each other by relative movement.

For example, should the distance between the die means 43 and 45 increase when the relative movement is provided between the members 43 and 45, the die means 43 and 45 not only shear the members 39 and 40 from each other but also tend to straighten the stock 36 before the same is sheared into the individual members 39 and 40 in the manner previously described for the apparatus 25.

Therefore, it can be seen that the apparatus and method 41 of this invention provide unique means for forming a plurality of individual members 39 and 40 from the stock 36.

Accordingly, this invention not only provides an improved method for making individual members from a length of stock, but this invention also provides an improved apparatus for making such members from such stock or the like.

While the form of the invention now preferred has been disclosed as required by the statues, other forms may be used, all coming within the scope of the claims which follow.

What is claimed is:

1. A method for making a plurality of individual members comprising the steps of providing a length of stock having a plurality of said members integrally joined together, and stretching said stock to untwist the same while shearing said members from each other.

2. A method as set forth in claim 1 wherein said step of providing said stock includes the step of extruding said stock.

3. A method for making a plurality of individual members having rectangular cross sections comprising the steps of providing a length of stock having a plurality of said members integrally joined together at the corners thereof, and stretching said stock to untwist the same while shearing said members from each other.

4. A method as set forth in claim 3 wherein said step of providing said stock includes the step of forming said stock with two rows of said members in such a manner that one member of one row is joined to at least one member of the other row.

5. A method as set forth in claim 3 wherein said step of providing said stock includes the step of forming said stock with a central member having the four corners thereof integrally and respectively joined to corners of four outer members.

6. A method for making a plurality of individual members having corners thereon comprising the steps of providing a length of stock having a plurality of said members integrally joined together at adjacent corners thereof, and stretching said stock to untwist the same while shearing said members from each other.

7. A method as set forth in claim 6 wherein said step of providing said stock includes the step of extruding said stock.

8. A method for making a plurality of individual members having longitudinal corners comprising the steps of providing a length of stock having a plurality of said members integrally joined together at adjacent longitudinal corners thereof, and causing longitudinal relative movement between said members to shear said members from each other.

9. A method for making a plurality of individual members having substantially rectangular cross-sectional configurations comprising the steps of providing a length of stock having a plurality of said members arranged in two rows wtih each member being integrally joined to at least one member in the opposite row at the adjacent corners thereof, holding the members of one row at one end of stock by a first means, holding the members of the other row at the other end of said stock by a second means, and causing relative movement between said first and second means to shear said members from each other.

10. A method as set forth in claim 9 wherein said last-named step also straightens said members.

11. A method as set forth in claim 9 wherein said step of providing said stock also includes the step of extruding said stock.

12. A method for making a plurality of individual members having longitudinal corners comprising the steps of providing a length of stock having a central member integrally connected at the longitudinal corners thereof to adjacent longitudinal corners of outer members, and causing longitudinal relative movement between said members to shear said members from each other.

13. A method for making a plurality of individual members having substantially rectangular cross-sectional configurations comprising the steps of providing a length of stock having a central member integrally interconnected at the four corners thereof to adjacent corners of four other outer members, holding the central member at one end of said stock by a first means, holding the outer members at the other end of said stock by a second means, and causing relative movement between said first and second means to shear said members from each other.

14. A method as set forth in claim 13 wherein said last-named step also straightens said members.

15. A method as set forth in claim 13 wherein said step of providing said stock also includes the step of extruding said stock.

16. Apparatus for making a plurality of individual members from a length of stock having the members integrally interconnected together, longitudinal edge means thereof that are substantially parallel to the longitudinal axis of said stock, said apparatus comprising a first die means for holding certain of said members at one end of said stock, a second die means for holding the remaining of said members at the other end of said stock, and means for causing relative movement between said die means in a direction substantially along said longitudinal axis of said stock to shear said members from each other.

17. Apparatus as set forth in claim 16 wherein said last-named means also straightens said members.

18. Apparatus for making a plurality of individual members from a length of stock having a first row of members integrally interconnected at the corners thereof to adjacent corners of a second row of said members, said apparatus comprising a first die means for holding said first row of members at one end of said stock, a second die means for holding said second row of members at the other end of said stock, and means for causing relative movement between said die means to shear said members from each other.

19. Apparatus for making a plurality of individual members from a length of stock having a central member integrally interconnected at the corners thereof to adjacent corners of outer members, said apparatus comprising a first die means for holding the central member at one end of said stock, a second die means for holding the outer members at the other end of said stock, and means for causing relative movement between said die means to shear said members from each other.

References Cited

UNITED STATES PATENTS

| | | | |
|---|---|---|---|
| 1,199,080 | 9/1916 | Jones | 72—254 |
| 1,314,037 | 8/1919 | Ambery | 72—255 |
| 2,711,793 | 6/1955 | Zalkind | 225—101 |
| 2,716,805 | 9/1955 | Reed | 72—256 |
| 2,830,643 | 4/1958 | Harris | 72—256 |
| 3,018,885 | 1/1962 | Trautman | 72—255 |

CHARLES W. LANHAM, *Primary Examiner.*

W. H. JUST, E. M. COMBS, *Assistant Examiners.*